(12) United States Patent
Ugur et al.

(10) Patent No.: US 8,275,041 B2
(45) Date of Patent: Sep. 25, 2012

(54) HIGH ACCURACY MOTION VECTORS FOR VIDEO CODING WITH LOW ENCODER AND DECODER COMPLEXITY

(75) Inventors: Kemal Ugur, Tampere (FI); Jani Lainema, Tampere (FI)

(73) Assignee: Nokia Corporation, Espoo (FI)

( * ) Notice: Subject to any disclaimer, the term of this patent is extended or adjusted under 35 U.S.C. 154(b) by 1111 days.

(21) Appl. No.: 12/099,731

(22) Filed: Apr. 8, 2008

(65) Prior Publication Data

US 2008/0253459 A1 Oct. 16, 2008

Related U.S. Application Data

(60) Provisional application No. 60/910,783, filed on Apr. 9, 2007.

(51) Int. Cl.
*H04N 7/12* (2006.01)

(52) U.S. Cl. ......... 375/240.16; 375/240.17; 375/240.24; 375/240.08

(58) Field of Classification Search ............. 375/240.16, 375/240.17, 240, 240.01, 240.24, 240.08
See application file for complete search history.

(56) References Cited

U.S. PATENT DOCUMENTS

| | | | |
|---|---|---|---|
| 7,620,109 B2* | 11/2009 | Srinivasan | 375/240.29 |
| 7,840,096 B2* | 11/2010 | Song | 382/300 |
| 8,009,739 B2* | 8/2011 | Holcomb et al. | 375/240.25 |
| 2003/0174775 A1* | 9/2003 | Nagaya et al. | 375/240.12 |
| 2004/0039903 A1* | 2/2004 | Wise et al. | 712/300 |
| 2004/0252766 A1 | 12/2004 | Lee et al. | |
| 2005/0226334 A1 | 10/2005 | Han | |
| 2005/0226335 A1* | 10/2005 | Lee et al. | 375/240.16 |

(Continued)

FOREIGN PATENT DOCUMENTS

JP 2005-503734 2/2005

(Continued)

OTHER PUBLICATIONS

Wedi et al. "1/8-pel Motion Vector Resolution for TML-4." Video Standards and Drafts, Aug. 15, 2000.

(Continued)

*Primary Examiner* — Kwang B Yao
*Assistant Examiner* — Nguyen Ngo
(74) *Attorney, Agent, or Firm* — Alston & Bird LLP

(57) ABSTRACT

Two-stage interpolation can be provided for frame prediction samples with quarter-pixel and finer accuracy. All samples of quarter-pixel and finer accuracy can use either half or full/integer-pixels in a bi-linear interpolation to allow for the use of higher accuracy motion vectors, such as one-eighth-pixel accuracy motion vectors. The motion vectors can be restricted in a manner such that they are not allowed to point to every possible sub-pixel sample on a sub-pixel grid, but rather a subset of those sub-pixel samples. In addition, the same full/integer and half-pixel samples that can be used to obtain a quarter-pixel sample can also be used to obtain a one-eighth-pixel sample that the quarter-pixel sample is connected to. Hence, for every quarter-pixel sample, a motion vector could point to two additional positions/locations with one-eighth-pixel accuracy, where the two additional positions/locations can be calculated using the same half or integer-pixel samples which were used to obtain the quarter-pixel sample. Therefore, an arbitrary motion vector accuracy can be achieved without the need to perform additional interpolation stages or increase the complexity of a decoder configured to decode motion vector data.

16 Claims, 8 Drawing Sheets

U.S. PATENT DOCUMENTS

| | | | |
|---|---|---|---|
| 2006/0120459 A1* | 6/2006 | Park et al. | 375/240.17 |
| 2006/0133507 A1 | 6/2006 | Lim et al. | |
| 2008/0037647 A1* | 2/2008 | Stojancic et al. | 375/240.17 |
| 2009/0135914 A1* | 5/2009 | Sato et al. | 375/240.16 |
| 2009/0238480 A1* | 9/2009 | Nakaya | 382/238 |

FOREIGN PATENT DOCUMENTS

| | | |
|---|---|---|
| WO | WO 03/026296 A | 3/2003 |
| WO | WO 03/026296 A1 | 3/2003 |
| WO | WO 2006/001585 A | 1/2006 |

OTHER PUBLICATIONS

Goto et al. "H-264 Video Encoder Implementation on a Low-power DSP with Low and Stable Computational Complexity." Signal Processing Systems Design and Implementation, Oct. 1, 2006.

International Search Report of PCT Application No. PCT/IB2008/051325.

Office Action for Chinese Patent Application No. 2008800108875, dated May 17, 2011.

English translation of Office Action for Chinese Patent Application No. 2008800108875, dated May 17, 2011.

English Translation of Office Action for Korean Application No. 2009-7023317, dated Nov. 30, 2010.

Reasons for Rejection from Japanese Application No. 2010-502617, mailed Dec. 6, 2011.

Office Action for Canadian Application No. 2,681,210 dated Jan. 5, 2012.

Office Action from Chinese Patent Application No. 2008800108875, dated Mar. 7, 2012.

* cited by examiner

| A | a | b | c | B |
| d | e | f | g | $d_0$ |
| h | i | j | k | $h_0$ |
| l | m | n | o | $l_0$ |
| C | $a_0$ | $b_0$ | $c_0$ | D |

Figure 8

HIGH ACCURACY MOTION VECTORS FOR VIDEO CODING WITH LOW ENCODER AND DECODER COMPLEXITY

FIELD OF THE INVENTION

The present invention relates generally to video coding. More particularly, the present invention relates to utilizing higher accuracy motion vectors to improve motion compensated prediction video coding without increasing coding complexity.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Motion Compensated Prediction (MCP) is a technique used by video compression standards to reduce the size of an encoded bitstream. In MCP, a prediction for a current frame is formed using a previously coded frame(s), where only the difference between original and prediction signals, representative of the current and predicted frames, is encoded and sent to a decoder. A prediction signal, representative of a prediction frame, is formed by first dividing a current frame into blocks, e.g., macroblocks, and searching for a best match in a reference frame for each block. In this way, the motion of a block relative to the reference frame is determined and this motion information is coded into a bitstream as motion vectors. A decoder is able to reconstruct the exact prediction frame by decoding the motion vector data encoded in the bitstream.

The motion vectors are not limited to having full-pixel accuracy, but could have fractional-pixel accuracy as well. That is, motion vectors can point to fractional-pixel positions/locations of the reference frame, where the fractional-pixel locations can refer to, for example, locations "in between" image pixels. In order to obtain samples at fractional-pixel locations, interpolation filters are used in the MCP process. Conventional video coding standards describe how a decoder can obtain samples at fractional-pixel accuracy by defining an interpolation filter. In MPEG-2, for example, motion vectors can have at most, half-pixel accuracy, where the samples at half-pixel locations are obtained by a simple averaging of neighboring samples at full-pixel locations. The H.264/AVC video coding standard supports motion vectors with up to quarter-pixel accuracy. Furthermore, in the H.264/AVC video coding standard, half-pixel samples are obtained through the use of symmetric and separable 6-tap filters, while quarter-pixel samples are obtained by averaging the nearest half or full-pixel samples.

It is known that better prediction in the MCP process could be obtained by using higher accuracy motion vectors. For example, using motion vectors with ⅛ (one-eighth) pixel accuracy can increase the coding efficiency of video coding system. However, the conventional use of high accuracy motion vectors (e.g., in literature studies and as considered during the development of the H.264/AVC video coding standard) generally increases both encoding and decoding complexity, where the increase in complexity involves two factors. A first factor is that an encoder must perform additional motion estimation steps to check the candidate one-eighth pixel accuracy positions. A second factor is the need for both the encoder and decoder to perform additional and usually complex interpolation to obtain the one-eighth pixel samples.

For example, two different interpolation techniques for one-eighth pixel accuracy are described in the following references: T. Wedi, "⅛-pel motion vector resolution for H.26L", ITU-T Q.15/SG16, doc. Q15-K-21, Portland, Oreg. USA, August 2000; and T Wedi "Complexity reduced motion compensated prediction with ⅛-pel displacement vector resolution", ITU-T Q.6/SG16, doc. VCEG-L20, Eibsee, Germany, January 2001. A first conventional algorithm uses a three-stage interpolation process to obtain at least one-eighth pixel sample in frame 106 as indicated in FIG. 1. At least a half-pixel and a quarter-pixel sample can be obtained using 6-tap (or 8-tap) filtering with regard to frames 102 and 104, respectively, and the one-eighth pixel sample can be obtained using bi-linear filtering. In particular, two instances of the 6-tap or 8-tap filtering can be utilized, e.g., Filter 108 and Filter 110, while a single instance of the bi-linear filtering, e.g., Filter 112, can be utilized. With this conventional approach, the interpolation complexity of both quarter-pixel and one-eighth pixel samples are significantly larger than that of the H.264/AVC video coding standard due to the need, for example, to perform the at least two cascaded 6-tap interpolations applied with regard to a full frame 100. In addition, an encoder would need to store at least quarter-pixel upsampled data in a memory unit to perform efficient motion estimation.

A second algorithm involves using direct interpolation for quarter and one-eighth pixel samples to reduce the decoding complexity. Hence, direct interpolation can refer to quarter and one-eighth pixel samples being obtained only by using integer samples. In this way, there is no need to perform operations with long cascading filters. This conventional algorithm has a similar decoding complexity to the H.264/AVC video coding standard. However, this algorithm has drawbacks with regard to encoder complexity. This is because the encoder needs to perform high-complexity interpolation for each candidate quarter and one-eighth pixel motion vectors in a motion estimation stage. Performing such high-complexity interpolation increases the complexity of the encoding process by a considerable amount.

Another alternative still, is to pre-calculate quarter and one-eighth pixel samples before the frame encoding process and store this in memory. However, this approach significantly increases the memory required for the encoder. Therefore, a system and method is needed for utilizing high accuracy motion vectors which does not increase the complexity of the encoding and/or decoding processes, and which increases the coding efficiency of the system and method.

SUMMARY OF THE INVENTION

Various embodiments provide two-stage interpolation for frame prediction samples with quarter-pixel and finer accuracy. That is, all samples having quarter-pixel and finer accuracy can use either half or full/integer-pixels in a bi-linear interpolation to allow for the use of higher accuracy motion vectors, such as one-eighth-pixel accuracy motion vectors. The motion vectors can be restricted in a manner such that they are not allowed to point to every possible sub-pixel sample on a sub-pixel grid, but rather a subset of those sub-pixel samples. In addition, the same full/integer and half-pixel samples that can be used to obtain a quarter-pixel sample can also be used to obtain a one-eighth-pixel sample that the quarter-pixel sample is connected to. Hence, for every quarter-pixel sample, a motion vector could point to two additional locations with one-eighth pixel accuracy, where the two additional locations can be calculated using the same half or integer-pixel samples which were used to obtain the quarter-pixel sample. Therefore, an arbitrary motion vector accuracy can be achieved without the need to perform additional interpolation stages or increase the complexity of a decoder configured to decode motion vector data.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 8 shows notation utilized in accordance with various embodiments to denote full and sub-pixel locations;

DETAILED DESCRIPTION OF THE PREFERRED EMBODIMENTS

Figure 1:
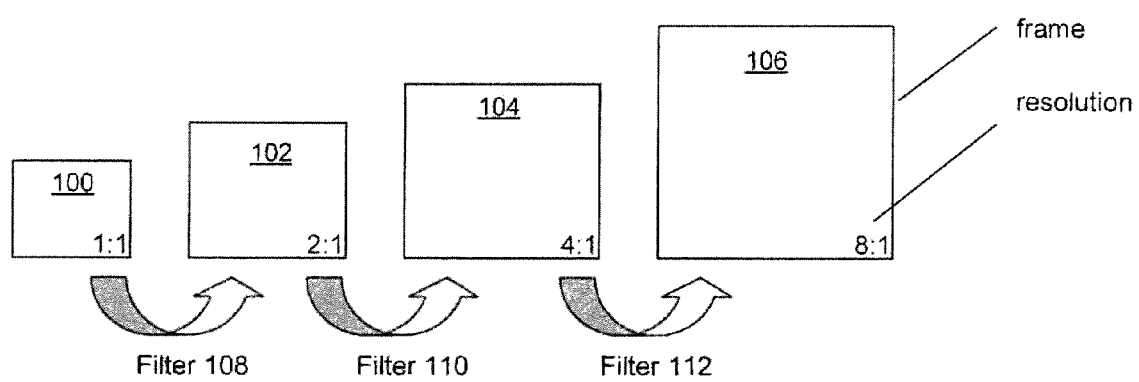
FIG. 1 illustrates a conventional three stage interpolation structure.
Figure 2:
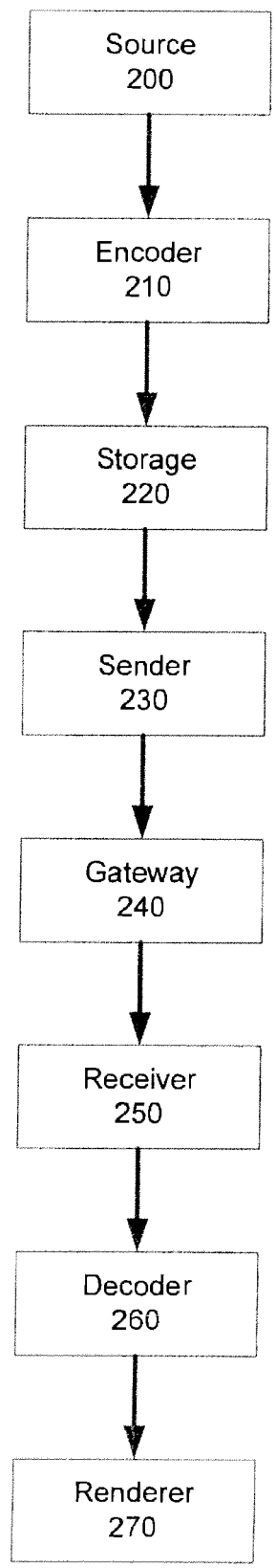
FIG. 2 shows a generic multimedia communications system for use with the present invention.

FIG. 2 shows a generic multimedia communications system for use with the present invention. As shown in FIG. 2, a data source 200 provides a source signal in an analog, uncompressed digital, or compressed digital format, or any combination of these formats. An encoder 210 encodes the source signal into a coded media bitstream. The encoder 210 may be capable of encoding more than one media type, such as audio and video, or more than one encoder 210 may be required to code different media types of the source signal. The encoder 210 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 210 is considered to simplify the description without a lack of generality.

It should be understood that, although text and examples contained herein may specifically describe an encoding process, one skilled in the art would readily understand that the same concepts and principles also apply to the corresponding decoding process and vice versa.

The coded media bitstream is transferred to a storage 220. The storage 220 may comprise any type of mass memory to store the coded media bitstream. The format of the coded media bitstream in the storage 220 may be an elementary self-contained bitstream format, or one or more coded media bitstreams may be encapsulated into a container file. Some systems operate "live", i.e. omit storage and transfer coded media bitstream from the encoder 210 directly to a sender 230. The coded media bitstream is then transferred to the sender 230, also referred to as the server, on a need basis. The format used in the transmission may be an elementary self-contained bitstream format, a packet stream format, or one or more coded media bitstreams may be encapsulated into a container file. The encoder 210, the storage 220, and the sender 230 may reside in the same physical device or they may be included in separate devices. The encoder 210 and the sender 230 may operate with live real-time content, in which case the coded media bitstream is typically not stored permanently, but rather buffered for small periods of time in the content encoder 210 and/or in the sender 230 to smooth out variations in processing delay, transfer delay, and coded media bitrate.

The sender 230 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 230 encapsulates the coded media bitstream into packets. For example, when RTP is used, the sender 230 encapsulates the coded media bitstream into RTP packets according to an RTP payload format. Typically, each media type has a dedicated RTP payload format. It should be again noted that a system may contain more than one sender 230, but for the sake of simplicity, the following description only considers one sender 230.

The sender 230 may or may not be connected to a gateway 240 through a communication network. The gateway 240 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 240 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 240 is called an RTP mixer and acts as an endpoint of an RTP connection.

The system includes one or more receivers 250, typically capable of receiving, de-modulating, and de-capsulating the transmitted signal into a coded media bitstream. The codec media bitstream is typically processed further by a decoder 260, whose output is one or more uncompressed media streams. Finally, a renderer 270 may reproduce the uncompressed media streams with a loudspeaker or a display, for example. The receiver 250, the decoder 260, and the renderer 270 may reside in the same physical device or they may be included in separate devices.

It should be noted that the bitstream to be decoded can be received from a remote device located within virtually any type of network. Additionally, the bitstream can be received from local hardware or software.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 3:
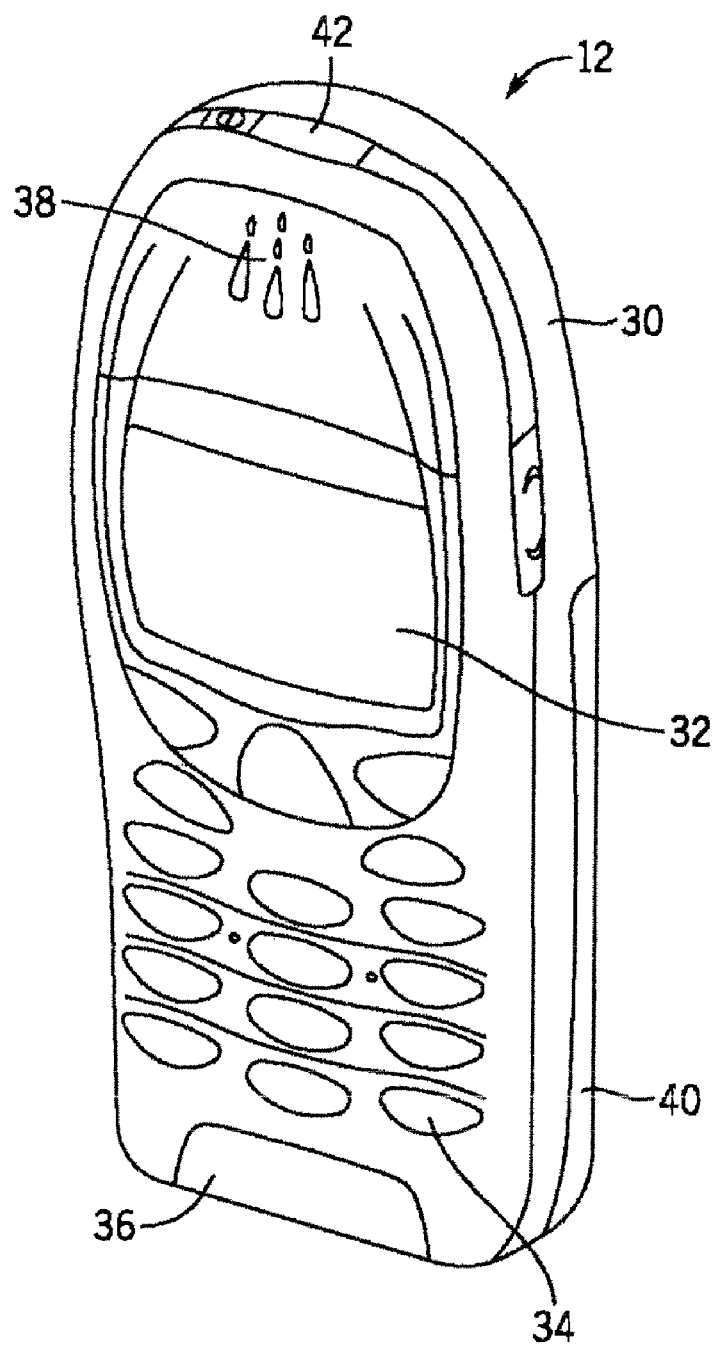
FIG. 3 is a perspective view of a mobile device that can be used in the implementation of the present invention.
Figure 4:
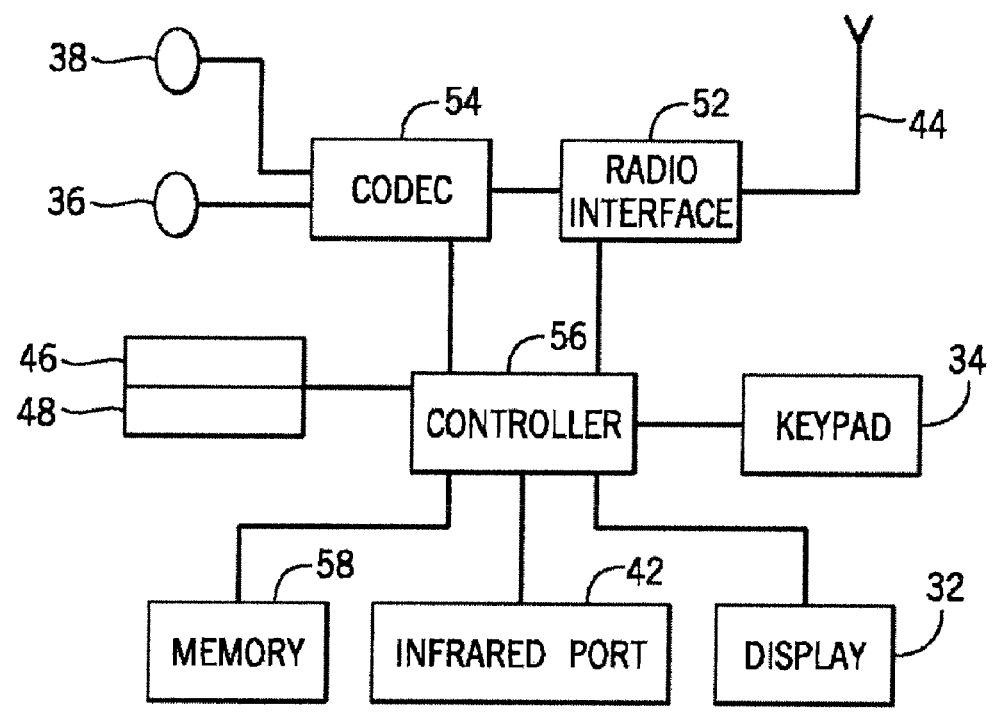
FIG. 4 is a schematic representation of the device circuitry of the mobile device of FIG. 3.

FIGS. 3 and 4 show one representative mobile device 12 within which the present invention may be implemented. It should be understood, however, that the present invention is not intended to be limited to one particular type of mobile device 12 or other electronic device. Some or all of the features depicted in FIGS. 3 and 4 could be incorporated into any or all of the devices represented in FIG. 2.

The mobile device 12 of FIGS. 3 and 4 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Various embodiments can extend conventional two-stage sub-pixel interpolation algorithms, such as the algorithm used in the H.264/AVC video coding standard, to achieve an arbitrary accuracy without the need to perform additional interpolation stages or increase the complexity of the decoder. That is, motion vectors can be restricted so that they are allowed to point only to those positions/locations that are located directly between the full and half-pixel samples that can be used to interpolate quarter pixel samples. As a result, sub-pixel samples can be derived from the same full and half-pixel samples that a closest quarter-pixel sample is derived from, and yet the sub-pixel samples can have a finer accuracy than those closest quarter-pixel samples. It should be noted that various embodiments can be implemented by and/or in conjunction with other video coding standards besides the H.264/AVC video coding standard.

Figure 5:
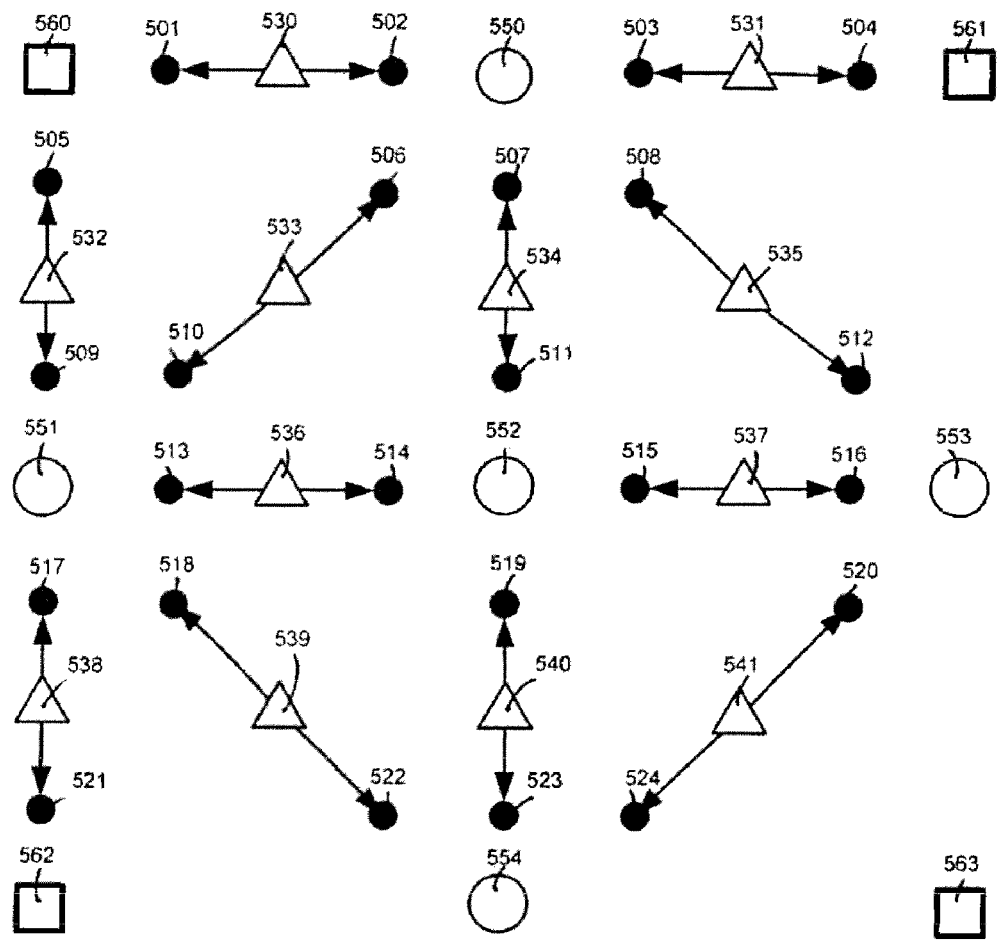
FIG. 5 is a diagrammatic representation of allowed pixel locations and connections in accordance with one embodiment.
Figure 6:
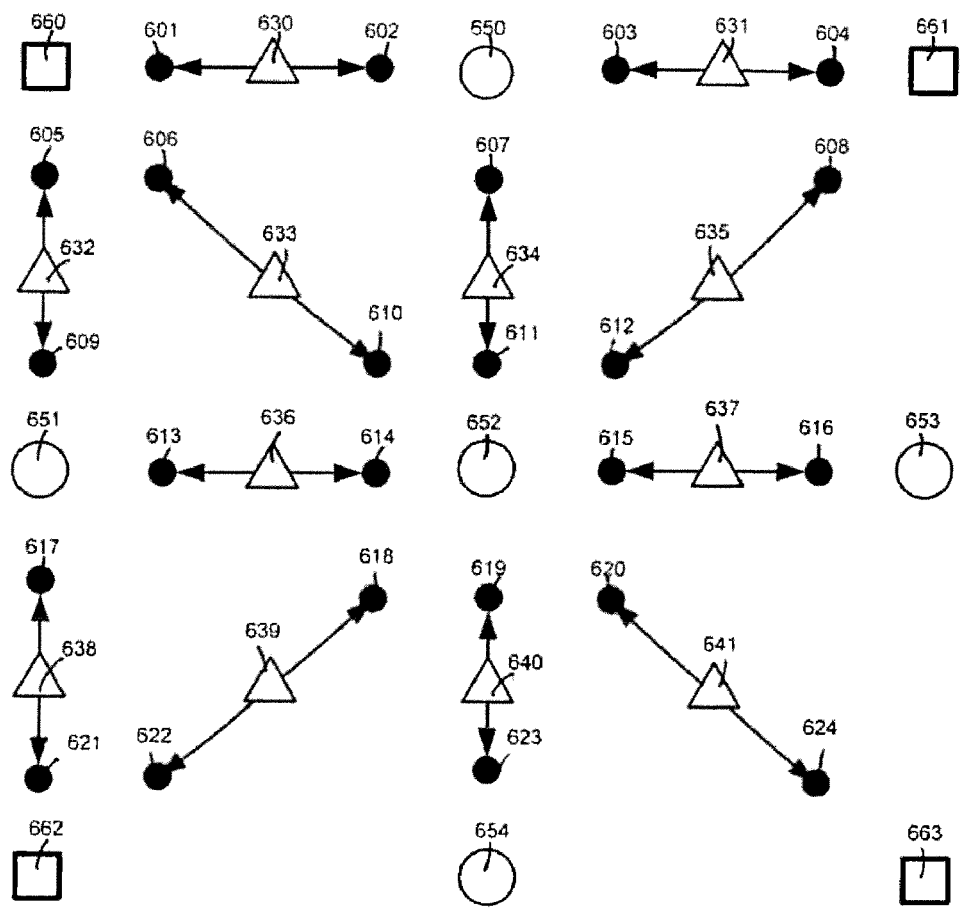
FIG. 6 is a diagrammatic representation of allowed pixel locations and connections in accordance with another embodiment.
Figure 7:
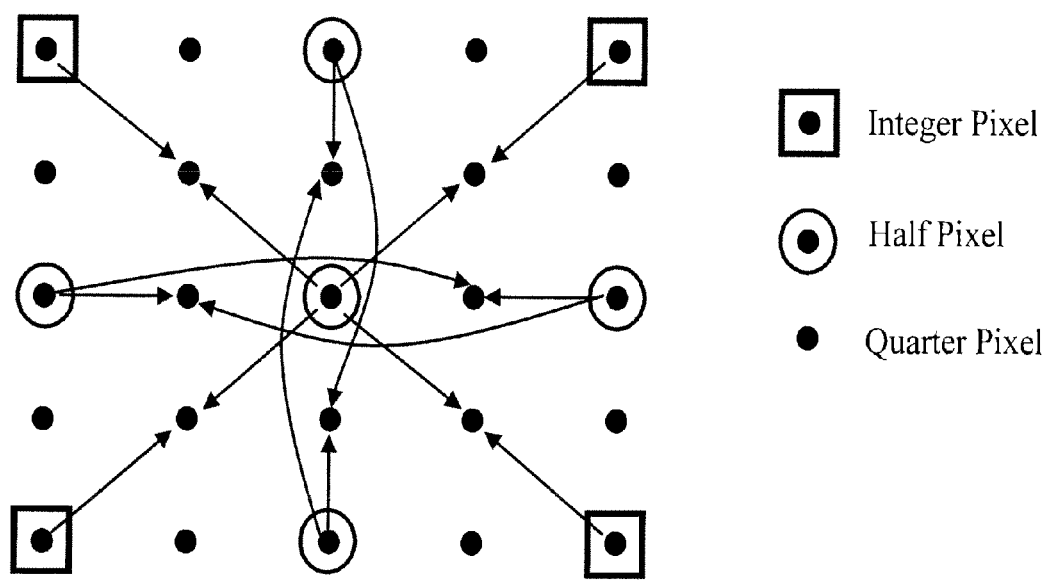
FIG. 7 is a diagrammatic representation of a fractional interpolation structure.

One embodiment can be used for motion vectors with one-eighth sample accuracy. In this exemplary embodiment, one-eighth-pixel samples that motion vectors are allowed to point to when various embodiments are applied to the H.264/AVC fractional interpolation structure are shown in FIG. 5. Similarly, the one-eighth-pixel samples that motion vectors are allowed to point to in another fractional interpolation structure are shown in FIG. 6, where the structure, specifically a sub-pixel bi-linear interpolation structure, is shown in FIG. 7. In FIGS. 5 and 6, one-eighth-pixel samples are indicated by shaded circles 501-524 and 601-624, respectively, and are shown as being connected to a neighboring quarter-pixel sample with an arrow. Quarter-pixel samples are indicated by triangles 530-541 in FIG. 5 and by triangles 630-641 in FIG. 6. Half-pixel samples are indicated by un-shaded circles 550-554 and 650-654 in FIGS. 5 and 6, respectively. Full/integer-pixel samples are indicated by squares 560-563 and 660-663 in FIGS. 5 and 6, respectively.

Therefore, FIGS. 5 and 6 illustrate how the same full and half-pixel samples that can be used to obtain a quarter-pixel sample can also be used to obtain a one-eighth-pixel sample that the quarter-pixel sample is connected to. In conventional two-stage interpolation, a quarter-pixel can be calculated using bi-linear filtering of the two nearest half or integer-pixel samples. According to various embodiments, this technique can be extended to apply to one-eighth-pixel accuracy. That is, for every quarter-pixel sample, a motion vector could point to two additional positions/locations with one-eighth-pixel accuracy, where the two additional locations can be calculated using the same half or full/integer-pixel samples which were used to obtain the quarter-pixel sample.

FIGS. 5 and 6 show these two additional locations for each quarter-pixel. For example, one-eighth-pixel samples 501 and 502 are connected to quarter-pixel sample 530 in FIG. 5. FIG. 6 as well, shows one-eighth-pixel samples 608 and 612 as being connected to quarter-pixel sample 635, for example. It should be noted that each of the two additional locations and the original quarter-pixel location to which the set of two additional locations are connected can be indicated with a one_eighth_pixel_offset syntax element in one embodiment. It should also be noted that the one_eighth_pixel_offset syntax element need only be transmitted, for example, when a motion vector is not pointing to a full or half-pixel position/location.

Because the motion vectors are restricted to one-eighth-pixel resolution in accordance with one embodiment, a motion vector coding technique can be utilized, which is different from conventional coding techniques. For example, full, half and quarter-pixel motion vectors can be coded in the same way as is conventionally executed with regard to the H.264/AVC coding standard. However, if an initially transmitted motion vector has quarter-pixel accuracy, an additional syntax element can be transmitted to indicate at least one one-eighth-pixel offset (if any exists). Alternatively, the motion vectors can have an accuracy that is greater than one-eighth-pixel accuracy, in which case, the syntax element can indicate an offset appropriate to the greater accuracy level.

In accordance with various embodiments, certain approaches exist which can save bits for transmitting the offset described above. One approach can involve predicting the offset from neighboring macroblocks, thus re-arranging the variable length codes that are utilized. Another approach can involve predicting the offset based on the motion vector difference coded in the bitstream (e.g., if a zero motion vector difference is indicated in the bitstream, an offset derived from the motion vectors that were used to generate the predicted motion vector for the block can be used). Yet another approach can be utilized, where the motion accuracy for the picture, group of pictures, macroblock, group of macroblocks or a block can be indicated. For example, an indication can be set in a macroblock header, where the indication can signal that only quarter-pixel motion accuracy is applied for the macroblock. In this case, no additional syntax needs to be transmitted for the motion vectors in the macroblock. Alternatively, the indication can be configured depending on the mode of the macroblock. For example, in a scenario where a macroblock has only one motion vector (e.g., the motion partition size is 16×16) the indication would not save many bits and so could be avoided.

Exemplary processes executed by and/or in conjunction with an encoder(s) and decoder(s) in accordance with various embodiments of a video coding system and method that can support one-eighth-pixel accurate motion vectors are described in detail below. It should be noted, however, that various embodiments could be extended to operate with a finer accuracy one-eighth-pixel accuracy.

With regard to an exemplary decoding operation/algorithm, one or more one-eighth-pixel locations can be obtained. With regard to an exemplary encoder operation/algorithm, one or more one-eighth-pixel accuracy motion vectors can be found. It should be noted that certain assumptions can be made for the decoder/encoder algorithms. For example, it can be assumed that at least one-eighth-pixel offset syntax element is transmitted for every quarter-pixel motion vector, without any dependency on another syntax element present in macroblock header. If a dependency exists for improving coding efficiency, the algorithms described below in Table 1 can be extended in a straightforward manner. In addition, it can be assumed that a one-eighth-pixel offset is not predicted from neighboring macroblocks. However, if it is desired to predict a one-eighth-pixel from neighboring macroblocks, it should be noted that straightforward extensions to the algorithms are again possible.

Figure 8:
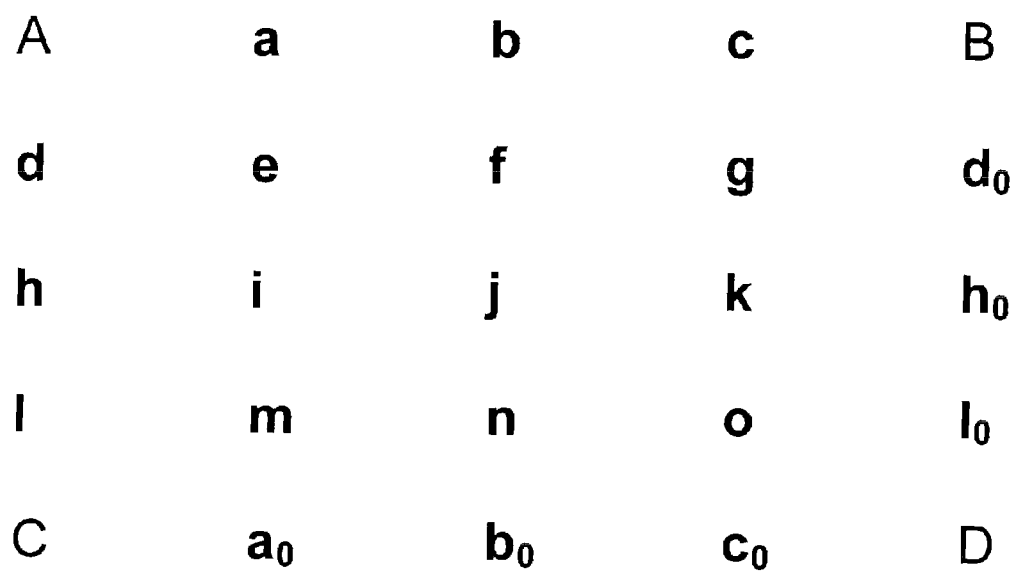

In accordance with an exemplary decoding operation, after a motion vector is decoded, a decoder, e.g., the decoder 260, can read a one-eighth-pixel offset syntax element if the decoded motion vector corresponds to quarter-pixel accuracy. Using the quarter-pixel motion vector, the decoder 260 can calculate a quarter-pixel position to which the motion vector points. FIG. 8 illustrates a possible notational structure which can be utilized with the algorithms described in Table 1 below. In other words, using a quarter-pixel location and a one-eighth-pixel offset, the decoder 260 can use the equations presented in Table 1, to obtain relevant one-eighth-pixel accuracy samples. For example, the notational structure shown in FIG. 8 can be applied to the various pixel locations shown in FIG. 5. That is, quarter-pixel location "a" of FIG. 8 can refer to quarter-pixel location 530 of FIG. 5, where the "−1" one-eighth-pixel-offset can refer to the one-eighth-pixel sample 501 and the "1" one-eighth-pixel offset can refer to the one-eighth-pixel sample 502. It should be noted that the equations/algorithms described below are applicable to the fractional interpolation structure of the H.264/AVC video coding standard and to the sub-pixel bi-linear interpolation structure illustrated in FIG. 7. However, the equations/algorithms can be extended/adapted for use with fractional interpolation structures including, but not limited to H.241/RCDO.

TABLE 1

| Quarter-Pixel Location | One-Eighth-Pixel-Offset | Equation/Algorithm for H.264/AVC | Equation/Algorithm for the sub-pixel bi-linear interpolation structure of FIG. 7 |
|---|---|---|---|
| a | −1 | $(3 * A + b + 2) >> 2$ | $(3 * A + b + 2) >> 2$ |
|   | 0 | $(A + b + 1) >> 1$ | $(A + b + 1) >> 1$ |
|   | 1 | $(A + 3 * b + 2) >> 2$ | $(A + 3 * b + 2) >> 2$ |
| c | −1 | $(3 * b + B + 2) >> 2$ | $(3 * b + B + 2) >> 2$ |
|   | 0 | $(b + B + 1) >> 1$ | $(b + B + 1) >> 1$ |
|   | 1 | $(b + 3 * B + 2) >> 2$ | $(b + 3 * B + 2) >> 2$ |
| d | −1 | $(3 * A + h + 2) >> 2$ | $(3 * A + h + 2) >> 2$ |
|   | 0 | $(A + h + 1) >> 1$ | $(A + h + 1) >> 1$ |
|   | 1 | $(A + 3 * h + 2) >> 2$ | $(A + 3 * h + 2) >> 2$ |
| e | −1 | $(3 * b + h + 2) >> 2$ | $(3 * A + j + 2) >> 2$ |
|   | 0 | $(b + h + 1) >> 1$ | $(A + j + 1) >> 1$ |
|   | 1 | $(b + 3 * h + 2) >> 2$ | $(A + 3 * j + 2) >> 2$ |
| f | −1 | $(3 * b + h + 2) >> 2$ | $(7 * b + b_0 + 4) >> 3$ |
|   | 0 | $(b + h + 1) >> 1$ | $(3 * b + b_0 + 2) >> 2$ |
|   | 1 | $(b + 3 * h + 2) >> 2$ | $(5 * b + 3 * b_0 + 4) >> 3$ |
| g | −1 | $(3 * b + h_0 + 2) >> 2$ | $(3 * B + j + 2) >> 2$ |
|   | 0 | $(b + h_0 + 1) >> 1$ | $(B + j + 1) >> 1$ |
|   | 1 | $(b + 3 * h_0 + 2) >> 2$ | $(B + 3 * j + 2) >> 2$ |
| i | −1 | $(3 * h + j + 2) >> 2$ | $(7 * h + h_0 + 4) >> 3$ |
|   | 0 | $(h + j + 1) >> 1$ | $(3 * h + h_0 + 2) >> 2$ |
|   | 1 | $(h + 3 * j + 2) >> 2$ | $(5 * h + 3 * h_0 + 4) >> 3$ |
| k | −1 | $(3 * j + h_0 + 2) >> 2$ | $(h + 7 * h_0 + 4) >> 3$ |
|   | 0 | $(j + h_0 + 1) >> 1$ | $(h + 3 * h_0 + 2) >> 2$ |
|   | 1 | $(j + 3 * h_0 + 2) >> 2$ | $(3 * h + 5 * h_0 + 4) >> 3$ |

TABLE 1-continued

| Quarter-Pixel Location | One-Eighth-Pixel-Offset | Equation/Algorithm for H.264/AVC | Equation/Algorithm for the sub-pixel bi-linear interpolation structure of FIG. 7 |
|---|---|---|---|
| l | −1 | $(3 * h + C + 2) >> 2$ | $(3 * h + C + 2) >> 2$ |
|   | 0 | $(h + C + 1) >> 1$ | $(h + C + 1) >> 1$ |
|   | 1 | $(h + 3 * C + 2) >> 2$ | $(h + 3 * C + 2) >> 2$ |
| m | −1 | $(3 * h + b_0 + 2) >> 2$ | $(3 * j + C + 2) >> 2$ |
|   | 0 | $(h + b_0 + 1) >> 1$ | $(j + C + 1) >> 1$ |
|   | 1 | $(h + 3 * b_0 + 2) >> 2$ | $(j + 3 * C + 2) >> 2$ |
| n | −1 | $(3 * j + b_0 + 2) >> 2$ | $(3 * b + 5 * b_0 + 4) >> 3$ |
|   | 0 | $(j + b_0 + 1) >> 1$ | $(b + 3 * b_0 + 2) >> 2$ |
|   | 1 | $(j + 3 * b_0 + 2) >> 2$ | $(b + 7 * b_0 + 4) >> 3$ |
| o | −1 | $(3 * h_0 + b_0 + 2) >> 2$ | $(3 * j + D + 2) >> 2$ |
|   | 0 | $(h_0 + b_0 + 1) >> 1$ | $(j + D + 1) >> 1$ |
|   | 1 | $(h_0 + 3 * b_0 + 2) >> 2$ | $(j + 3 * D + 2) >> 2$ |

In accordance with an exemplary encoding operation to find one-eighth-pixel motion vectors, it should be noted that encoder algorithm can be optimized for low complexity. However, better coding efficiency can be achieved with a higher complexity encoding operation if desired. The exemplary encoding operation is configured to find a best full/integer and half-pixel accuracy motion vector. Thereafter, a search is conducted for neighboring quarter-pixel locations. For the quarter-pixel locations, a cost function can be appropriately modified to include an indication of a one-eighth-pixel-offset as zero. If the motion vector giving the lowest cost has quarter-pixel accuracy, a search can be done for the two candidate one-eighth-pixel-offsets (i.e., −1 and 1) using the equations described in Table 1. It should be noted that for this search, the cost function can be modified appropriately to include indication a one-eighth-pixel-offset as either 1 or −1.

Therefore, various embodiments can provide a two-stage interpolation for all samples with quarter-pixel and finer accuracy (i.e., all quarter-pixel and finer accuracy samples use either half and/or full/integer-pixels in a bi-linear interpolation). This can be achieved by restricting the motion vectors so that they are not allowed to point every possible sub-pixel sample on a sub-pixel grid, but rather a subset of those, as described above.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of decoding motion vector data encoded in a bitstream, comprising:
   determining that a pixel offset syntax element is encoded in the bitstream and that a motion vector has at least quarter-pixel accuracy;
   reading the pixel offset syntax element;
   utilizing the motion vector having the at least quarter-pixel accuracy to calculate a position of a first sample having the at least quarter-pixel accuracy to which the motion vector points;
   utilizing a fractional interpolation structure algorithm to obtain a second sample having a pixel accuracy greater than the first sample;
   wherein the second sample is representative of one of at least two additional sample positions associated with the first sample, the at least two additional sample positions each having an accuracy greater than the at least quarter-pixel accuracy; and
   wherein the at least two additional sample positions are calculated using at least one of a full-pixel sample position and a half-pixel sample position, and wherein the at least one of the full-pixel sample position and the half-pixel sample position is the same sample position utilized to determine the first sample having the at least quarter-pixel accuracy.

2. The method of claim 1, wherein the pixel offset syntax element comprises a one-eighth-pixel offset syntax element and the second sample comprises a one-eighth-pixel accuracy sample.

3. The method of claim 1, wherein the pixel offset syntax element and the second sample have an accuracy greater than one-eighth-pixel accuracy.

4. The method of claim 1, wherein the pixel offset syntax element is representative of a pixel offset and the pixel offset is indicative of a position of the second sample.

5. The method of claim 4, wherein the pixel offset syntax element has no dependency upon another pixel offset syntax element present in a macroblock header and the pixel offset is not predicted from a neighboring macroblock header.

6. The method of claim 4, wherein the pixel offset is predicted from a neighboring macroblock.

7. The method of claim 4, wherein the pixel offset is predicted based on a motion vector difference coded in the bitstream.

8. The method of claim 4, wherein the pixel offset is indicative of a motion accuracy for at least one a picture, a group of pictures, a macroblock, a group of macroblocks, and a block in relation to the pixel offset.

9. The method of claim 8, wherein the motion accuracy depends on a mode of at least the macroblock.

10. The method of claim 4 further comprising, utilizing an extended fractional interpolation structure algorithm if the offset syntax element is dependent upon another offset syntax element.

11. The method of claim 1, wherein the motion vector does not point to every possible sub-pixel sample on a sub-pixel grid including at least the first sample and the second sample.

12. A computer program product, embodied on a non-transitory computer-readable medium, comprising computer code configured to perform the processes of claim 1.

13. An apparatus, comprising:
   a processor; and
   a memory unit operatively connected to the processor and including computer coded instructions configured to, with the processor, cause the apparatus to:
      determine that a pixel offset syntax element is encoded in a bitstream and that a motion vector encoded in the bitstream has at least quarter-pixel accuracy;
      read the pixel offset syntax element;
      utilize the motion vector having the at least quarter-pixel accuracy to calculate a position of a first sample having the at least quarter-pixel accuracy to which the motion vector points;
      utilize a fractional interpolation structure algorithm to obtain a second sample having a pixel accuracy greater than the first sample;
   wherein the second sample is representative of one of at least two additional sample positions associated with the first sample, the at least two additional sample positions each having an accuracy greater than the at least quarter-pixel accuracy; and
   wherein the at least two additional sample positions are calculated using at least one of a full-pixel sample position and a half-pixel sample position, and wherein the at least one of the full-pixel sample position and the half-pixel sample position is the same sample position utilized to determine the first sample having the at least quarter-pixel accuracy.

14. The apparatus of claim 13, wherein the pixel offset syntax element comprises a one-eighth-pixel offset syntax element and the second sample comprises a one-eighth-pixel accuracy sample.

15. The apparatus of claim 13, wherein the pixel offset syntax element is representative of a pixel offset and the pixel offset is indicative of a position of the second sample.

16. The apparatus of claim 13, wherein the motion vector is restricted from pointing to every possible sub-pixel sample on a sub-pixel grid including at least the first sample and the second sample.

\* \* \* \* \*